US008274861B1

(12) United States Patent
Marn et al.

(10) Patent No.: US 8,274,861 B1
(45) Date of Patent: Sep. 25, 2012

(54) UNDERWATER NETWORK HAVING BUOYANCY COMPENSATION AND ANCHORING SYSTEMS

(75) Inventors: William H. Marn, San Diego, CA (US); James Ben Penney, San Diego, CA (US); Lonnie Allen Hamme, Jamul, CA (US); Christopher Lawson Fletcher, San Diego, CA (US); Robert Kevin Creber, San Diego, CA (US); James Gabriel Buescher, San Diego, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 524 days.

(21) Appl. No.: 12/632,866

(22) Filed: Dec. 8, 2009

(51) Int. Cl.
*H04B 13/02* (2006.01)
*H04B 7/14* (2006.01)
(52) U.S. Cl. ........................................................ 367/134
(58) Field of Classification Search .................. 367/131, 367/134, 4; 455/40; 370/315
See application file for complete search history.

(56) References Cited

U.S. PATENT DOCUMENTS 3,772,639 A * 11/1973 Snyder ............................. 367/4
2009/0067289 A1 * 3/2009 Lee et al. ...................... 367/134

* cited by examiner

*Primary Examiner* — Daniel Pihulic
(74) *Attorney, Agent, or Firm* — Arthur K. Samora; Kyle Eppele

(57) ABSTRACT

An underwater wireless network can include plurality of nodes, each node having a cylindrical housing, a repeater, a transducer and a buoy. The housing defines a void and encloses the repeater. The transducer can be tethered to the housing and a buoy can be tethered to said transducer. Each node also includes at least two hemi-cylindrical flukes that can be pivotably attached to the housing. The housing can further be formed with at least two flood ports, and corresponding plugs are inserted into a respective fill port. Lanyards interconnect each flukes with a respective plug. During transport, the flukes can surround the transducer and the void is empty, which renders the node neutrally buoyant for ease of transport. For deployment, the flukes are pivoted away from each other to tighten the lanyards, which pull the plugs out of the flood ports, to further flood the void and deploy the node.

19 Claims, 6 Drawing Sheets

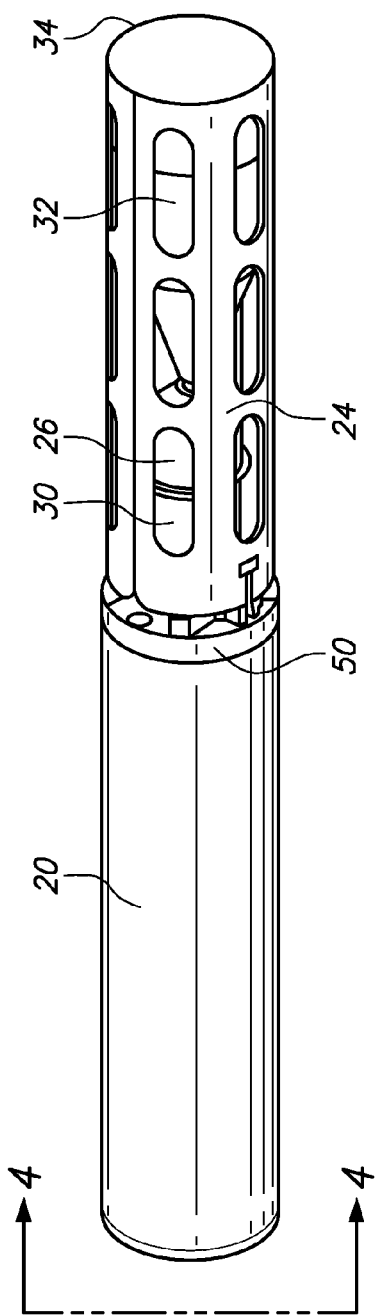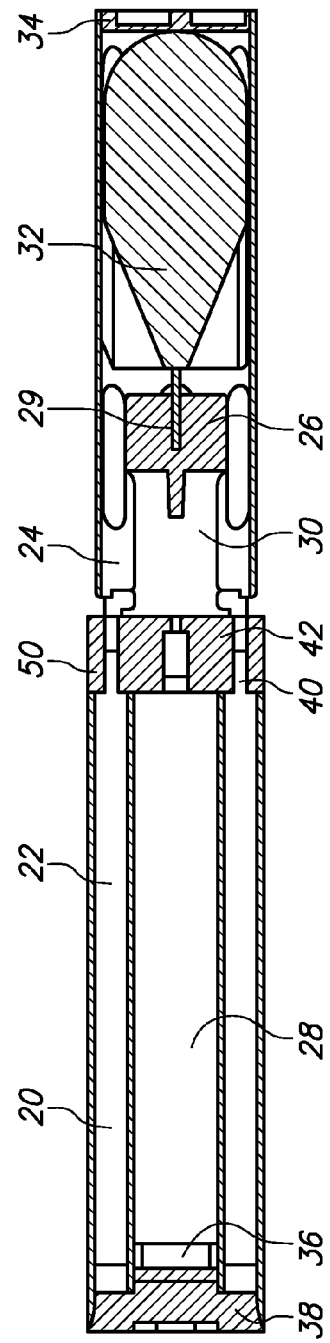

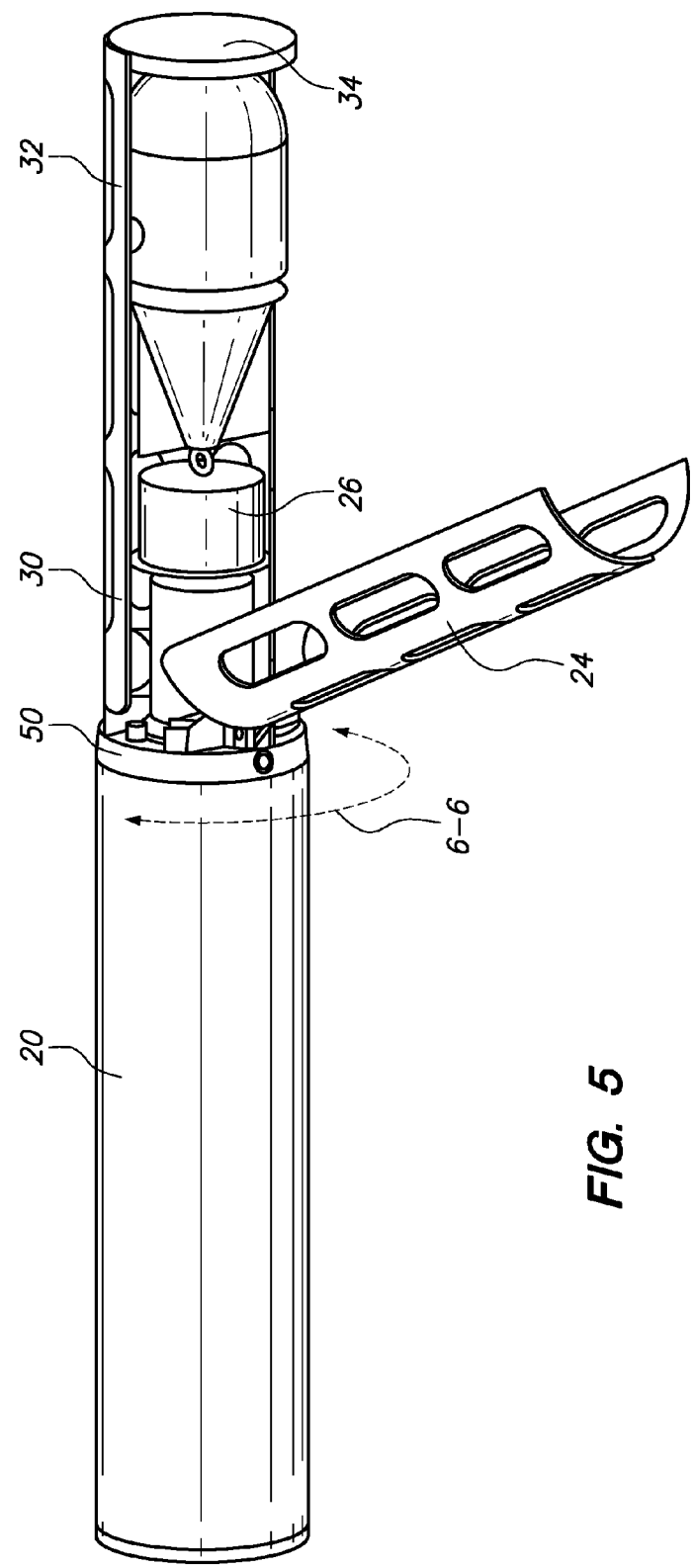

UNDERWATER NETWORK HAVING BUOYANCY COMPENSATION AND ANCHORING SYSTEMS

FEDERALLY-SPONSORED RESEARCH AND DEVELOPMENT

This invention (Navy Case No. 099708) is assigned to the United States Government and is available for licensing for commercial purposes. Licensing and technical inquires may be directed to the Office of Research and Technical Applications, Space and Naval Warfare Systems Center, Pacific, Code 72120, San Diego, Calif. 92152; voice (619) 553-2778; email T2@spawar.navy.mil.

FIELD OF THE INVENTION

The present invention pertains generally to systems and methods for providing an underwater wireless data network. More specifically, the present invention pertains to systems that provide for neutral buoyancy of underwater network nodes for easy movement during underwater transport, while also providing for ballast, anchoring and anti-roll effects after deployment of the nodes.

BACKGROUND OF THE INVENTION

It is sometimes desired to provide a capability to extend wireless networking capabilities from the terrestrial to the underwater domain, using through-water acoustic communications. To do this, a number of modem repeater nodes in a fixed network and associated equipment can make up an undersea communication grid. This provides an undersea network capable of providing connectivity between underwater fixed sensor grids, as well as between underwater networks and above water mobile platforms and command centers for various types of systems, platforms, missions, and sensor networks.

There can often be inherent difficulties in establishing underwater networks. The first difficulty can be transporting each network node to its desired underwater location. It may often more convenient to transport the nodes underwater. In this case, it can be further desired to maneuver the nodes to a precise location manually with a diver. If the nodes are negatively buoyant, this can result in a diver attempting to manually maneuver a node that might weigh over a hundred pounds, which is obviously an undesirable situation that should be avoided if at all possible.

Once nodes have been positioned according to the user's needs, it can be desired to anchor the nodes so that they remain in position with respect to other nodes for optimum communications, (such as data transfer, by way of non-limiting example) according to the prevailing undersea conditions (water temperature, existence of thermoclines, etc.). But underwater forces such as current can move the nodes to an undesired location without the knowledge of the network operator. This can cause decreased network performance, and in extreme cases, the movement of the nodes can make the network inoperable.

In view of the above, it is an object of the present invention to provide an underwater network with nodes that are neutrally buoyant during underwater transport. It is another object of the present invention to provide an underwater network with nodes that can be transported by a single diver, with or without the aid of an underwater transport system such as a Seal Delivery Vehicle (SDV). Another object of the present invention to provide an underwater network with nodes that have a low hydrodynamic drag to facilitate delivery underwater. Yet another object of the present invention is to provide an underwater network with nodes that allow for ballasting to create negative buoyancy for the node once it is desired to deploy the node to fix the node in position on the ocean or harbor floor. Still another object of the present invention is to provide an underwater network with nodes that provide anchoring and anti-roll effects that self-orient the nodes with respect to the sea/harbor bottom once deployed. More generally, another object of the present invention is to provide a method for delivery of a payload underwater that uses a neutrally buoyant housing, which can be flooded to deploy the payload according the needs of the user.

SUMMARY OF THE INVENTION

An underwater wireless network according to several embodiments of the invention can include several underwater nodes. Each node can include a housing, a repeater, a transducer and a buoy. The housing defines a void, which can contain the repeater. The transducer can be tethered to the repeater and a buoy can be tethered to said transducer. Each node can further include at least two hemi-cylindrical flukes that can be pivotably attached to the housing at one end. The flukes can be selectively pivoted to deploy the transducer and the buoy.

The housing can further be formed with at least two flood ports, and the nodes according to several embodiments can further include at least two plugs, with each plug corresponding to a respective fill port. A lanyard or lanyards can interconnect the flukes and the plugs. During transport, the flukes surround the transducer and the buoy so that the node can be more hydrodynamic when the node is transported underwater, and the plugs are inserted into the housing render the void watertight and to make the node neutrally buoyant. This transport configuration facilitates the transport of the node to a desired location for subsequent deployment.

For deployment, the flukes are pivoted away from each other, which tighten the lanyards and pull the plugs out of the flood ports. Once the plugs are pulled, a path of fluid communication can be established into the void, the void floods with water and the node becomes negatively buoyant. The buoy rises as far its tether will permit, which further suspends the transducer underwater for further use. Once this occurs, the node is in a deployed configuration and ready for incorporation within the wireless network.

In several embodiments, each node can further include a spring or resilient member that biases the flukes towards the deployment configuration, and a releasing means for engaging the resilient member. In other embodiments, the plugs can be coated with a corrosive material, with the corrosive material and plug material being chosen so that the corrosion of the plugs to the point where they fall out of the flood ports to flood the void occurs at a predetermined interval. In other embodiments, each node can further include a plurality of small explosive charges that correspond to a respective plug. The charges are placed on the node so that selective activation of the charges forces the plugs out of the flood ports, to flood the void and deploy the node.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which:

FIG. 3 is an isometric view of the node of FIG. 2 during transport;

FIG. 4 is cross-sectional view taken along line 4-4 in FIG. 3;

FIG. 5 is the same view as FIG. 3, but with one of the flukes partially deployed;

DETAILED DESCRIPTION OF THE EMBODIMENTS

Figure 1:
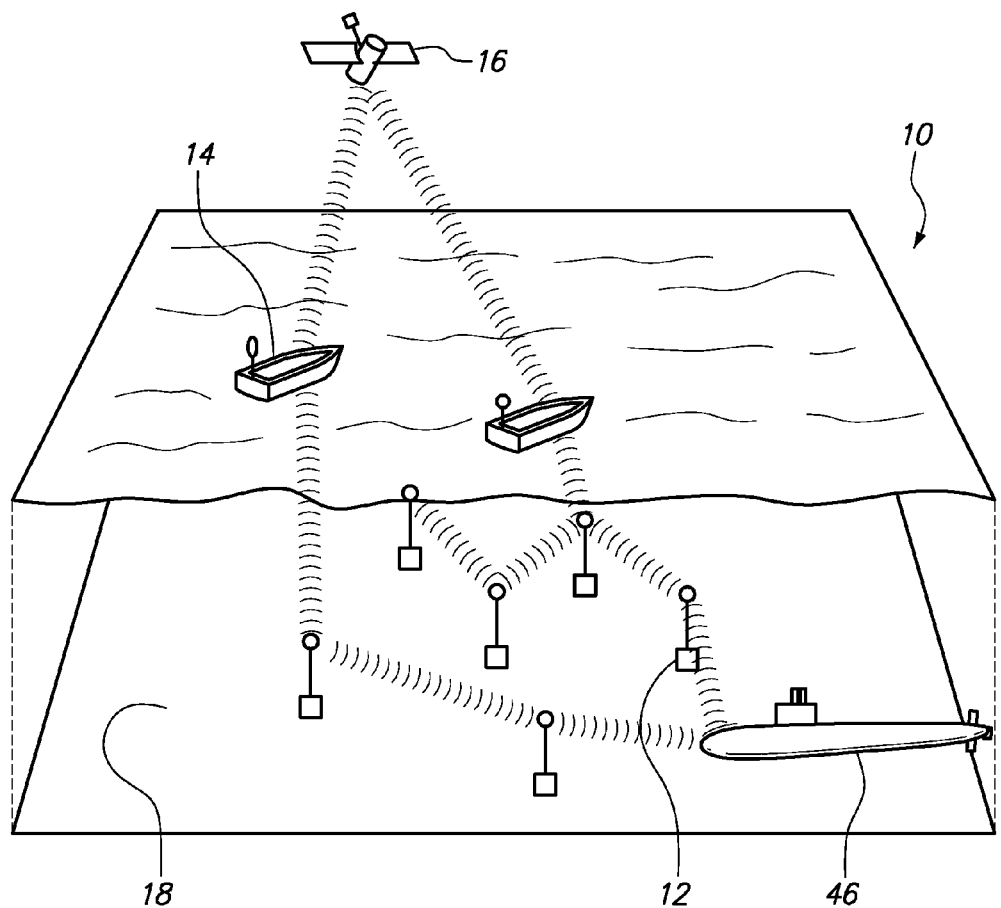
FIG. 1 is a drawing of an underwater wireless network according to several embodiments of the present invention.
Figure 2:
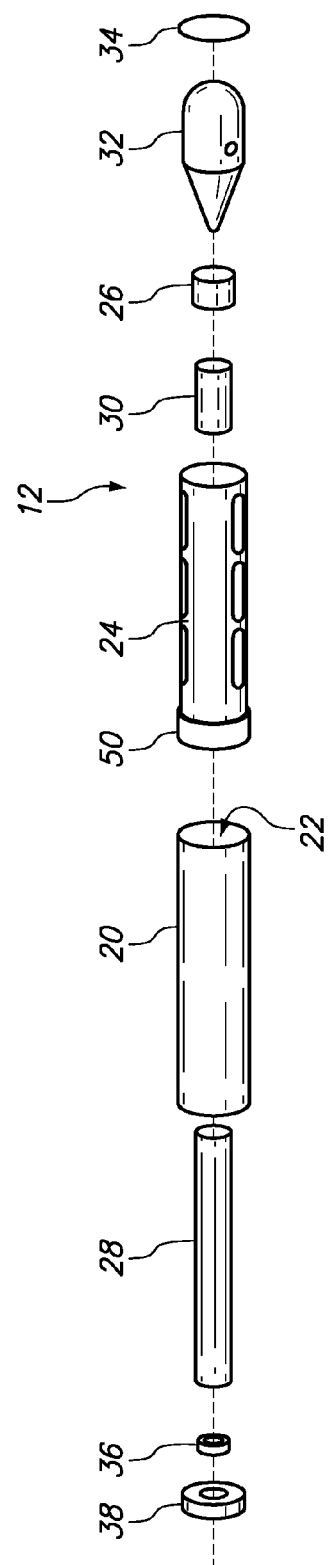
FIG. 2 is an exploded isometric view of a communications node from the network of FIG. 1.

Referring now to the Figures, the underwater wireless data transfer network according to several embodiments of the present invention can be shown and can be generally designated by reference character 10. In brief overview, and as shown in FIG. 1, the system 10 includes a plurality of underwater network nodes 12 that can be positioned and anchored on the floor 18 of an ocean or harbor. The nodes 12 can communicate with each other, with underwater assets such as submarine 46 and with surface assets 14. The network 10 can also be placed in communication with airborne assets 16 to establish an expanded communications network. But to do this, the underwater nodes must be efficiently and effectively maneuvered into position on the floor 18 of the ocean/harbor. The structure of the nodes 12, and the manner in which the nodes 12 can be maneuvered into position and fixed in place within the network 10 during deployment, are described in more detail below.

Figure 7:
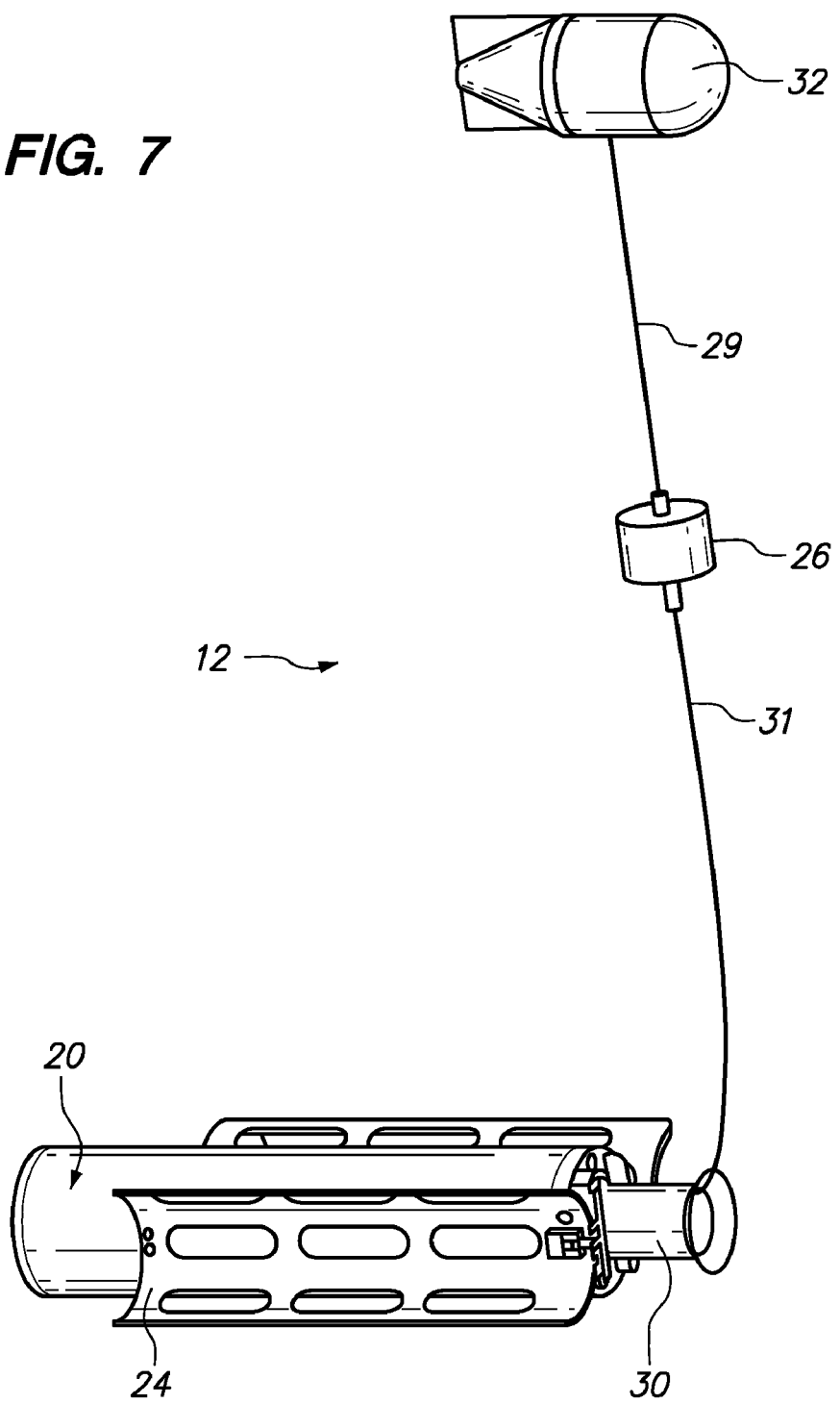

Referring now to FIGS. 2-5, the aforementioned node 12 can be shown in more detail. As shown, each node includes a housing 20 that defines a void 22. At least two hemi-spherical flukes 24 are pivotably attached to a housing cap 50, which can be further attached to one end of the housing. A fairlead 30 can be attached to the housing cap 50, so that the fairlead 30 is concentric to the flukes 24. A repeater 28 can be inserted into housing 20, and a transducer 26 can be electrically connected to repeater 28 via an electrical tether 31 that can be run through fairlead 30 (See FIG. 7). A buoy 32 can be further tethered to transducer 26 via tether 29 (FIG. 7). At the opposite end of the housing 20 from the flukes, a spacer 36 can position repeater 28 within the housing, and the spacer and repeater 28 can be retained in place with an end cap 38 that can be fastened to the housing 20.

The nodes 12 for the network 10 according to several embodiments of the present have a transport configuration and deployment configuration. For the transport configuration, it is desired that the nodes 12 have a neutrally buoyant configuration, and also that the nodes 12 have a minimum profile so that they are as hydrodynamic as possible, so that the user may transport the nodes 12 underwater, if desired. To do this, and as shown in FIGS. 3 and 4, the flukes 24 are positioned in the transport configuration so that they enclose the fairlead 30 and the transducer 26, and the electrical tether 31 can be coiled within fairlead 30. Tether 29 and buoy 32 are enclosed within flukes 24, as shown in the FIGS. 3 and 4. When node 12 is in a transport configuration, the flukes 24 can be fixed in place by aligning end cap holes 46 with fluke holes 54 and inserting a pull pin 52 (see FIG. 6).

As mentioned above, the housing 20 can be formed with void 22. The housing 20, end cap 38 and housing cap 50 cooperate to make the void 22 watertight. With this configuration, the node 12 has a cylindrical, tubular overall profile for ease of transport, and the buoy 32 and void 22 cooperate to provide a neutrally buoyant effect for the node, to facilitate transport. The materials for the node and the volume of the void (i.e., the dimensions of housing 20) can be chosen so that the node is neutrally buoyancy when the node is configured in this manner.

Figure 6:
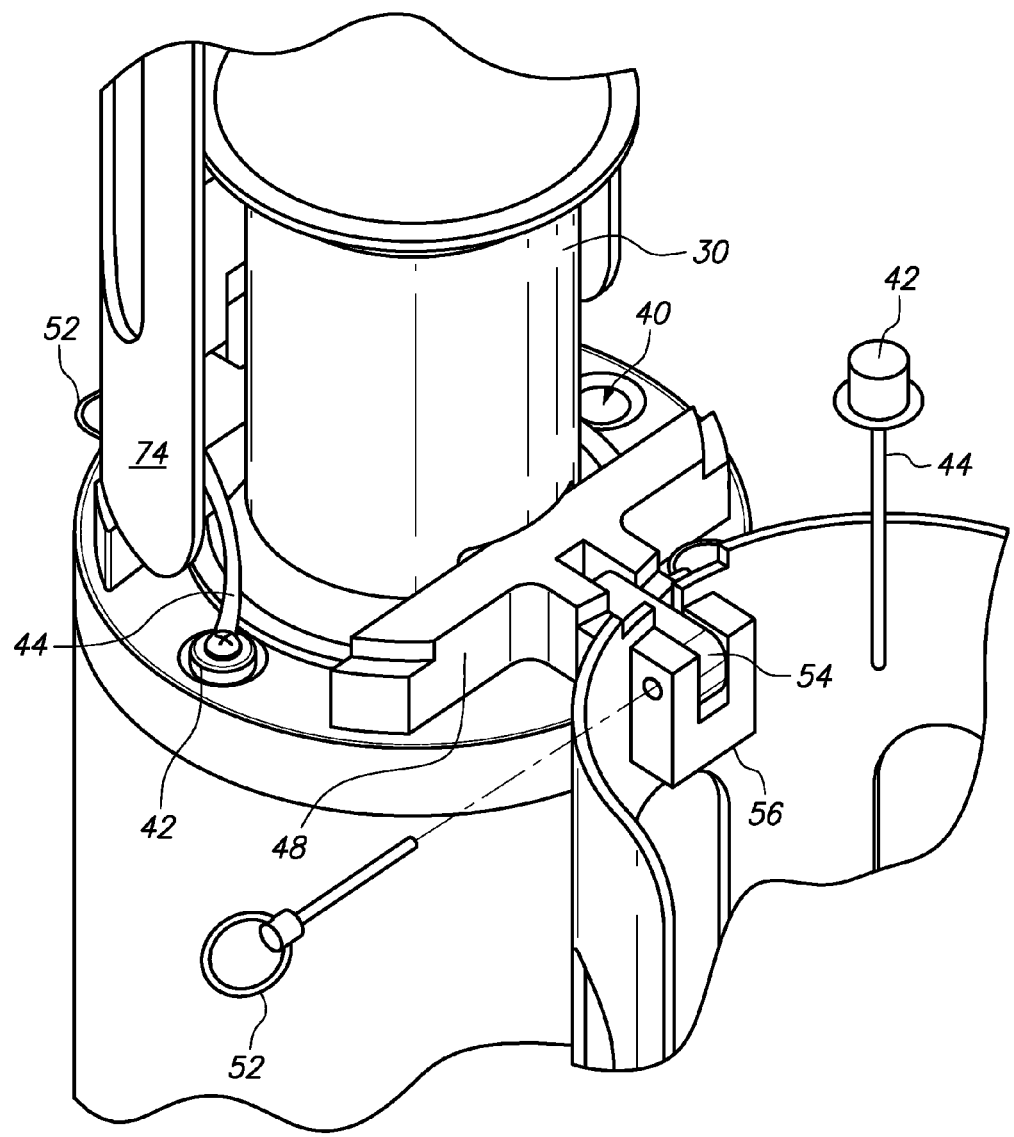
FIG. 6 is an enlarged isometric view taken along line 6-6 in FIG. 5, which shows the pivot connection of the flukes to the housing for several embodiments of the node of FIG. 2; and, FIG. 7 is an isometric view of a fully deployed communications node for the underwater network according to several embodiments of the present invention.

Referring now to FIGS. 4-6, the structure of the node 12 that facilitates deployment can be shown in greater detail. As shown in FIGS. 4 and 6, housing cap 50 can be formed with at least two flood ports 40, and a corresponding plug 42 can be inserted into each fill port. For each plug 42, a lanyard 44 can be attached to plug 42 and to fluke 24 to interconnect plug 42 with fluke 24. The lanyard 44 can be attached in any manner that is known in the art, such as by a weld or by a fastener such as a screw or rivet (not shown). The point of attachment of the lanyard 44 to the fluke 24 and the length of lanyard 44 are chosen so that lanyards pull the plugs 42 are pulled out of their respective flood ports 40 when the flukes 24 are deployed, as described below.

A detent 48 is mounted on end cap 50, and a hinge block 56 can be fixed to the interior concave surface of fluke 24, as shown in FIG. 6. To pivotably attach the flukes to housing cap 50, a hinge bar 54 can be used. To do this, holes can be formed in detent 48 and in both ends hinge block 56 (the holes are not shown in FIG. 6). The holes in one end of hinge bar 54 are then aligned with the holes in detent 48, and a retaining pin 52a can be inserted therethrough. Similarly, the holes in the other end of the hinge bar 54 can be aligned with the holes in hinge block 56 and retaining pin 52b can be inserted therethrough to pivotably attach fluke 24 to housing cap 50.

Once in position within network 10, the nodes are ready for deployment. For deployment, the end cap 34 can be removed. Next, flukes 24 are pivoted away from each other, and from the enclosed fairlead 30, transducer 26 and buoy 32. It should be appreciated that the flukes can be biased toward a deployment configuration to facilitate this movement away from each other by using a spring (not shown) or other type of resilient member. As the flukes pivot away from each other, the plugs are pulled out of respective flood ports 40. Once this occurs, a path of fluid communication can be established into the void 22, and the void 22 becomes flooded. As void 22 floods, the node 12 becomes negatively buoyant and sinks in place to the floor 18 of the ocean or harbor.

Referring now to FIG. 7, the fully deployed configuration for communications node 12 is shown. As shown, node 12 sinks to the floor because it is negatively buoyant and the flukes 24 provide an anchoring effect by digging into the ocean/harbor floor. The hemi-cylindrical geometry of the flukes 24 allows the flukes to dig into the ocean floor, which further provides an anti-roll effect for the node 12. Additionally, buoy 32 (which at a component level remains positively buoyant) floats toward the surface once it is freed from its transport position within the flukes. As buoy 32 rises, the tethered transducer 26 also rises. The buoy 32 continues to rise until it reaches the end of the tether 29 and electrical tether 31. The rising motion deploys the transducer 26 into an optimum position for more efficient data transfer within the network 10. The deployed configuration for the node 12 can be shown in FIG. 7. For the deployed configuration, void 22 has flooded and node is negatively buoyant. At the same time, transducer can be tethered to housing 20 via electrical tether 29, and buoy 32 can be tethered to transducer to keep transducer 26 positioned above housing 20.

In addition to the embodiments described above, it should be appreciated that there are other means to selectively remove the plugs 42 from the flood ports 40 for deployment of the node 12. For example, explosive micro-charges (not shown) could be placed on the plugs 42 to force plugs 42 out of the flood ports 40 when desired by the operator. Alternatively, it may be desired to coat the plugs 42 with a corrosive material prior to placement into the flood ports 40. The nodes 12 may then be moved into place, and the plugs can corrode due to effects of the corrosive material until the plugs either fall out of the fill port or until water pressure urges the plug 42 out of the fill port 40.

In addition to the underwater data transfer network 10 described herein, it should be appreciated that in a more general sense, the nodes 12 can be configured so that a payload can be inserted into the housing so that the node is neutrally buoyant and has a small hydrodynamic profile. Then, once the nodes are in position, the flukes can be deployed as described above to make the node negatively buoyant, and further to deploy the payload on the floor 18 of the ocean or harbor.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All systems and methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. An underwater wireless network comprising:
   at least one underwater node;
   each said node including a housing enclosing a repeater, a transducer tethered to said repeater and a buoy tethered to said transducer;
   each said node further including at least two hemi-cylindrical flukes pivotably attached to said housing; and,
   said flukes being selectively pivoted to deploy said transducer and said buoy.

2. The network of claim 1 wherein said housing defines a void, wherein said housing is formed with at least two flood ports, and further comprising:
   at least two plugs corresponding to said flood ports.

3. The network of claim 2 wherein each said node has a transport configuration, wherein said flukes enclose said transducer and said buoy, wherein said plugs are inserted into said flood ports to define a watertight void, and wherein said node is neutrally buoyant.

4. The network of claim 2 wherein each said node has a deployed configuration, wherein said plugs have been removed from said housing to establish a path of fluid communication into said void and flood said void, wherein said node is negatively buoyant, and wherein said flukes have pivoted outwardly from said each other to deploy said transducer and said buoy.

5. The network of claim 4, wherein each said node further comprises:
   a resilient member for biasing said flukes towards said deployment configuration; and,
   a releasing means for deploying said flukes from said transport configuration.

6. The network of claim 5, wherein each said plug is connected to a corresponding said fluke with a lanyard, and further wherein activation of said releasing means pulls said plugs out of said flood ports to flood said void.

7. The network of claim 5, further comprising a plurality of explosive charges, each said charge corresponding to a said plugs, said charges being selectively activated to force said plugs out of said flood ports to flood said void.

8. The network of claim 5 wherein said releasing means is a pull pin.

9. A method for establishing an underwater network for data transfer, said method comprising the steps of:
   A) providing an plurality of communications nodes, each said node including a housing enclosing a repeater, a positively buoyant transducer tethered to said repeater and a positively buoyant buoy tethered to said transducer;
   B1) establishing a annular void in said housing between said repeater and said void;
   B2) pivotably attaching at least two flukes to said housing so that said flukes enclose said transducer and said buoy during transport;
   B) transporting said nodes while said nodes are neutrally buoyant; and,
   C) deploying said nodes by flooding said housing.

10. The method of claim 9 wherein said step B) further comprises the steps of:
    B3) forming at least two flood ports in said housing;
    B4) plugging said flood ports with corresponding plugs.

11. The method of claim 10 wherein a connecting member connects said plugs to a corresponding said fluke, and wherein said step C) is accomplished by pivoting said flukes away from said transducer and said buoy to pull said plugs out of said flood ports and flood said void.

12. The method of claim 10, wherein said step C) further comprises the steps of:
    C1) placing a corresponding explosive charge on each said plug; and,
    C2) selectively activating each said charge to flood said void.

13. An underwater delivery system comprising:
    a housing defining a void, said housing further enclosing a payload;
    a buoy tethered to said housing;
    at least two hemi-cylindrical flukes pivotably attached to said housing to enclose said buoy; and,
    said flukes being selectively pivoted to deploy said transducer and said buoy.

14. The system of claim 13 wherein said housing is formed with at least two flood ports, and further comprising:
    at least two plugs, each said plug selectively inserted into a corresponding said fill port;
    at least two lanyards, each said lanyard connecting a corresponding said plug to a corresponding said fluke.

15. The system of claim 14 wherein said system has a transport configuration wherein said flukes surround said buoy, wherein said plugs are inserted into said fill port, and wherein said system is neutrally buoyant.

16. The system of claim 14 wherein said system has a deployed configuration wherein said flukes have pivoted away from said buoy to release said buoy, wherein said plugs have been removed from said housing to flood said void, further wherein said system is negatively buoyant.

17. The system of claim 15 further comprising:
   at least two biasing members corresponding to a respective said flukes for biasing said flukes towards said deployed configuration; and,
   at least two pull pins for selectively fixing said flukes in said transport configuration.

18. The system of claim 13 wherein said housing is formed with at least two flood ports, and further comprising:
   at least two plugs, each said plug inserted into a corresponding fill port; and,
   at least two explosive charges corresponding to said plugs, said charges being placed in said system to force said plugs out of said flood ports when said charges are selectively detonated.

19. The system of claim 13 wherein said housing is formed with at least two flood ports, and further comprising a means for selectively flooding said void through said ports.

* * * * *